United States Patent
Jang et al.

(10) Patent No.: US 9,884,560 B2
(45) Date of Patent: Feb. 6, 2018

(54) METHOD AND SYSTEM FOR CONTROLLING ON-BOARD BATTERY CHARGER OF VEHICLE

(71) Applicant: Hyundai Motor Company, Seoul (KR)

(72) Inventors: Hui Sung Jang, Gyeonggi-Do (KR); Hyun Wook Seong, Gyeonggi-do (KR); Shin Hye Chun, Jeollanam-do (KR); Mu Shin Kwak, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 195 days.

(21) Appl. No.: 14/929,265

(22) Filed: Oct. 31, 2015

(65) Prior Publication Data

US 2016/0339787 A1    Nov. 24, 2016

(30) Foreign Application Priority Data

May 21, 2015 (KR) .................. 10-2015-0070855

(51) Int. Cl.
*B60L 11/18* (2006.01)
*H02J 7/00* (2006.01)

(52) U.S. Cl.
CPC ......... *B60L 11/1809* (2013.01); *Y02B 70/126* (2013.01); *Y02T 10/7005* (2013.01)

(58) Field of Classification Search
CPC ........ B60L 11/1809; B60L 3/00; H02J 7/0052
USPC ........................................... 320/109; 701/22
See application file for complete search history.

(56) References Cited

U.S. PATENT DOCUMENTS

| | | | | |
|---|---|---|---|---|
| 6,255,744 B1 * | 7/2001 | Shih | ......................... | G06F 1/30 307/64 |
| 6,507,507 B2 * | 1/2003 | Tokunaga | ........... | H02M 1/4208 307/64 |
| 8,994,327 B2 * | 3/2015 | Kusch | ................. | B60L 11/1812 320/109 |
| 9,106,092 B2 * | 8/2015 | Park | ......................... | B60L 3/00 |
| 9,481,255 B2 * | 11/2016 | Yim | .................... | B60L 11/1809 |
| 9,667,081 B2 * | 5/2017 | Seong | ....................... | B60L 3/00 |

(Continued)

FOREIGN PATENT DOCUMENTS

| | | |
|---|---|---|
| JP | 10-290533 | 10/1998 |
| JP | 2003-174704 A | 6/2003 |
| JP | 2013-158240 A | 8/2013 |

(Continued)

*Primary Examiner* — M'Baye Diao
(74) *Attorney, Agent, or Firm* — Mintz Levin Cohn Ferris Glovsky and Popeo, P.C.; Peter F. Corless

(57) ABSTRACT

A system and method for controlling an on-board battery charger of an eco-friendly vehicle are provided. In the method, when instantaneous interruption of electric power occurs in an AC input power source, a DC-DC controller adjusts an output current instruction to be limited to the minimum charging power, and a power factor corrector (PFC) controller outputs a voltage instruction to a first capacitor (DC link capacitor) connected to an output terminal of the PFC controller to be updated to zero (0) or an actual value of the DC link capacitor. When the AC input power source is then restored, the PFC controller outputs the voltage instruction to the first capacitor to be increased to the existing voltage instruction with a predetermined slope, to smoothly perform the charging operation of the on-board battery charger without pause.

10 Claims, 6 Drawing Sheets

(56) References Cited

U.S. PATENT DOCUMENTS

| | | | | |
|---|---|---|---|---|
| 9,667,158 B2* | 5/2017 | Ando | ................... | H02M 1/42 |
| 2015/0349560 A1* | 12/2015 | Seong | ................... | B60L 3/00 |
| | | | | 320/107 |

FOREIGN PATENT DOCUMENTS

| JP | 2014-073022 A | 4/2014 |
|---|---|---|
| KR | 10-2013-0087748 | 8/2013 |
| KR | 10-2013-0090852 | 8/2013 |

\* cited by examiner

METHOD AND SYSTEM FOR CONTROLLING ON-BOARD BATTERY CHARGER OF VEHICLE

CROSS-REFERENCE TO RELATED APPLICATION

This application claims under 35 U.S.C. § 119(a) the benefit of Korean Patent Application No. 10-2015-0070855 filed on May 21, 2015, the entire contents of which are incorporated herein by reference.

BACKGROUND (a) Technical Field

The present invention relates to a method and system for controlling an on-board battery charger of an eco-friendly vehicle. More particularly, the present invention relates to a method and system for controlling an on-board battery charger of an eco-friendly vehicle, which enables a charging operation of the on-board battery charger to be more smoothly performed without pause until alternating current (AC) input power is restored after instantaneous interruption of electric power.

(b) Background Art

In general, a separate on-board battery charger configured to generate a charging current for a high-voltage battery by converting external power (e.g., household AC power) into rechargeable direct-current (DC) power is mounted in a plug-in hybrid electric vehicle or an electric vehicle, which is a type of eco-friendly vehicle. Accordingly, electric energy required during driving of the eco-friendly vehicle is charged to a battery using the on-board battery charger from an external AC power source (e.g., household AC power source), thereby performing the driving of the eco-friendly vehicle.

A method for charging a battery using the on-board battery charger includes applying household AC power to the on-board battery charger mounted within a vehicle, generating a charging current by converting, AC power into DC power using the on-board battery charger, and applying the charging current generated in the on-board battery charger to a high-voltage battery to charge the high-voltage battery.

FIG. 1 is a view illustrating an on-board battery charger of an eco-friendly vehicle according to the related art and FIG. 2 is a graph illustrating a conventional charging control process of an on-board battery charger when instantaneous interruption of electric power occurs in an input power source according to the related art. The on-board battery charger is used to charge a high-voltage battery as a main battery of the eco-friendly vehicle. As shown in FIG. 1, the on-board battery charger includes a power factor corrector (PFC) converter 1, a DC-DC converter 2, a PFC controller 3, a DC-DC converter controller 8, a first capacitor 4, and a second capacitor 5.

The PFC converter 1 is connected to an output terminal of an AC power source 6 to convert an AC input voltage $V_{AC}$, input from the AC power source 6, into a DC voltage $V_{DC}$ and simultaneously compensate a power factor of the AC power source 6. The DC-DC converter 2 is connected between an output terminal of the PFC converter 1 and an input terminal of a high-voltage battery 7 to receive a DC voltage $V_{DC}$ output from the PFC converter 1 and convert the DC voltage $V_{DC}$ into a voltage for charging the high-voltage battery 7.

In particular, an insulated DC-DC converter using a full-bridge or half-bridge type switching circuit may be used as the DC-DC converter 2. The first capacitor 4 and the second capacitor 5 are configured to constantly smooth an output voltage $V_{DC}$ of the PFC converter 1 and an output voltage $V_O$ of the DC-DC converter 2, respectively. The PFC controller 3 is configured to receive an AC current $I_{AC}$ and an AC voltage $V_{AC}$, output from the AC power source 6, and an output voltage $V_{DC}$ of the PFC converter 1 to operate the PFC converter 1. Additionally, the DC-DC converter controller 8 is configured to receive an output current $I_O$ and an output voltage $V_O$ of the DC-DC converter 2 to operate the DC-DC converter 2.

During the charging of the on-board battery charger configured as described above, although the transmission of the AC input voltage to the on-board battery charger is stopped due to instantaneous interruption or disconnection, the controller allows the existing charging control to be maintained regardless of the on/off of AC input power. When the AC input voltage to the on-board battery charger is instantaneously interrupted, the input voltage $V_{AC}$ is not input to the PFC converter 1. Accordingly, the control of the PFC converter 1 is impossible due to the absence of an input voltage, and the PFC controller 3 is unable to adjust the output voltage $V_{DC}$ of the PFC converter 1.

Referring to FIG. 2, as a charging operation of the on-board battery charger is adjusted to be the same as the existing state (e.g., state in which the AC input voltage is on) even though the AC input voltage $V_{AC}$ is off, that is, as the PFC controller 3 executes a current instruction to the PFC converter 1 and a voltage instruction to the first capacitor (e.g., DC link capacitor) identically to the existing state, the output voltage $V_{DC}$ of the first capacitor 4 gradually decreases to be less than the minimum voltage at an AC interruption section.

In other words, in a state in which input current and input voltage of the PFC converter are absent due to instantaneous interruption of electric power, that is, in a state in which the output voltage $V_{DC}$ of the first capacitor 4 is not maintained at the AC interruption section, the PFC controller 3 is configured to execute the voltage instruction to the first capacitor 4, and the like to the level of the existing instruction, to gradually decrease the output voltage $V_{DC}$ of the first capacitor 4 to be less than the minimum voltage. Therefore, control errors of the PFC controller are continuously accumulated.

Particularly, when the AC input power is restored due to release of the interruption, a substantial AC input voltage $V_{AC}$ and a substantial input current $I_{AC}$ are instantaneously applied to the PFC converter 1 as shown in FIG. 2, and therefore, a substantial inductor current $I_L$ instantaneously flows in the PFC converter 1. Additionally, a transient voltage for recharging the battery is applied to the first capacitor 4.

When an over-voltage or over-current is repeatedly generated in the on-board battery charger due to instantaneous interruption of electric power as described above, the charging operation of the on-board battery charger mounted within the vehicle is stopped due to damage to an internal device, etc. Accordingly, when a household power source is used to charge the on-board battery charger and the AC input power source does not supply power for a few milliseconds due to instantaneous interruption of the AC input power source, the on-board battery charger continuously charges the battery by exhausting the voltage of the DC link capacitor (first capacitor 4). After that, when the AC input power is restored, a current of a few hundreds of amperes or greater instantaneously flows in the DC link capacitor to recharge the battery, and therefore, an over-voltage greater than the withstand voltage may be applied to the DC link capacitor by the current.

As a result, problems such as damage to a device due to an over-current and to a capacitor due to an over-voltage greater than the withstand voltage may occur, and therefore, the charging operation of the on-board battery charger mounted within the vehicle is stopped.

SUMMARY

The present invention provides a method for controlling an on-board battery charger of an eco-friendly vehicle, in which, when instantaneous interruption of electric power occurs in an AC input power source, a DC-DC controller is configured to adjust an output current instruction to be limited to the minimum charging power, and a power factor corrector (PFC) controller is configured to adjust a voltage instruction to a first capacitor (DC link capacitor) connected to an output terminal of the PFC controller to be updated to zero (0) or an actual value of the DC link capacitor and, when the AC input power source is then restored, adjust the voltage instruction to the first capacitor to be increased to the existing voltage instruction with a predetermined slope, to smooth perform the charging operation of the on-board battery charger without pause.

In one aspect, the present invention provides a method for controlling an on-board battery charger of an eco-friendly vehicle that may include: determining whether interruption of electric power occurs in an AC input power source during a charging operation of the on-board battery charger; when the interruption of electric power occurs in an AC input power source, limiting an output current instruction for charging a high-voltage battery to a minimum charging current; adjusting a voltage instruction to a first capacitor connected to an output terminal of a power factor corrector (PFC) converter to be updated to zero (0) or an actual output voltage level of the first capacitor; when the AC input power source is restored, restoring the voltage instruction to the first capacitor to the original instruction; and restoring the output current instruction for charging the high-voltage battery to the original charging current instruction.

In an exemplary embodiment, when the interruption of electric power occurs in the AC input power source, the voltage instruction to the first capacitor may be adjusted to be updated to zero (0) by turning off the PFC controller or resetting an integrator in the PFC controller. When the AC input power source is restored, the PFC controller may be again turned on, and the resetting of the integrator may also be stopped.

In another exemplary embodiment, the voltage instruction to the first capacitor may be gradually restored to the original instruction with a predetermined step or a predetermined slope. In addition, the output current instruction for charging the high-voltage battery may be gradually restored to the original charging current instruction with a predetermined step or a predetermined slope. The output current instruction for charging the high-voltage battery may be restored to the original charging current instruction when the restoration of the voltage instruction to the first capacitor to the original instruction is completed.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

Figure 1:
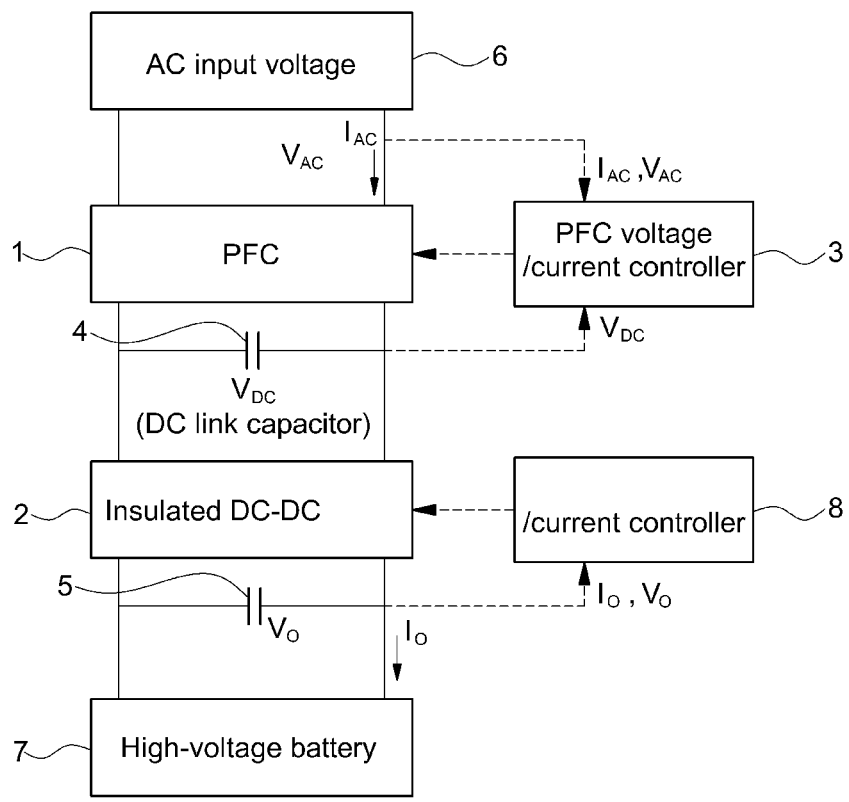
FIG. 1 is a view illustrating an on-board battery charger of an eco-friendly vehicle according to the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

As described above with reference to FIG. 1, an on-board battery charger of an eco-friendly vehicle may include a power factor corrector (PFC) converter 1, a DC-DC converter 2, a PFC controller 3, a DC-DC converter controller 8, a first capacitor (DC link capacitor) 4, a second capacitor 5, and the like.

In the present invention, when it is determined that instantaneous interruption of electric power has occurred in an AC input power source, the DC-DC converter controller 8 may be configured to adjust an output current instruction for charging a high-voltage battery to be limited to a minimum charging current. Additionally, the PFC controller 3 may be configured to adjust a voltage instruction to the first capacitor (e.g., DC link capacitor) to be updated to zero (0) or a current actual output voltage level of a DC link capacitor.

Furthermore, in the present invention, when the AC input power source is restored, the PFC controller 3 may be configured to adjust the voltage instruction to the first capacitor (DC link capacitor) to be gradually increased to the original voltage instruction to the DC link capacitor with a predetermined step or a predetermined slope. The DC-DC converter controller 8 may be configured to adjust the output current instruction for charging the high-voltage battery to be increased to the original output current instruction with a substantially constant slope at a time point when the restoration of the voltage instruction to the first capacitor to the original voltage instruction is completed.

By performing charging control until the AC input power source is restored after the instantaneous interruption of the AC input power source, instantaneous over-current and over-voltage may be prevented from being applied to the PFC converter and the DC link capacitor of the on-board battery charger, thus protecting internal devices (e.g., a diode, a switch, a capacitor, etc) of the on-board battery charger, components, and the like. Further, the charging operation of the on-board battery charger may be performed more smoothly without pause.

Figure 3:
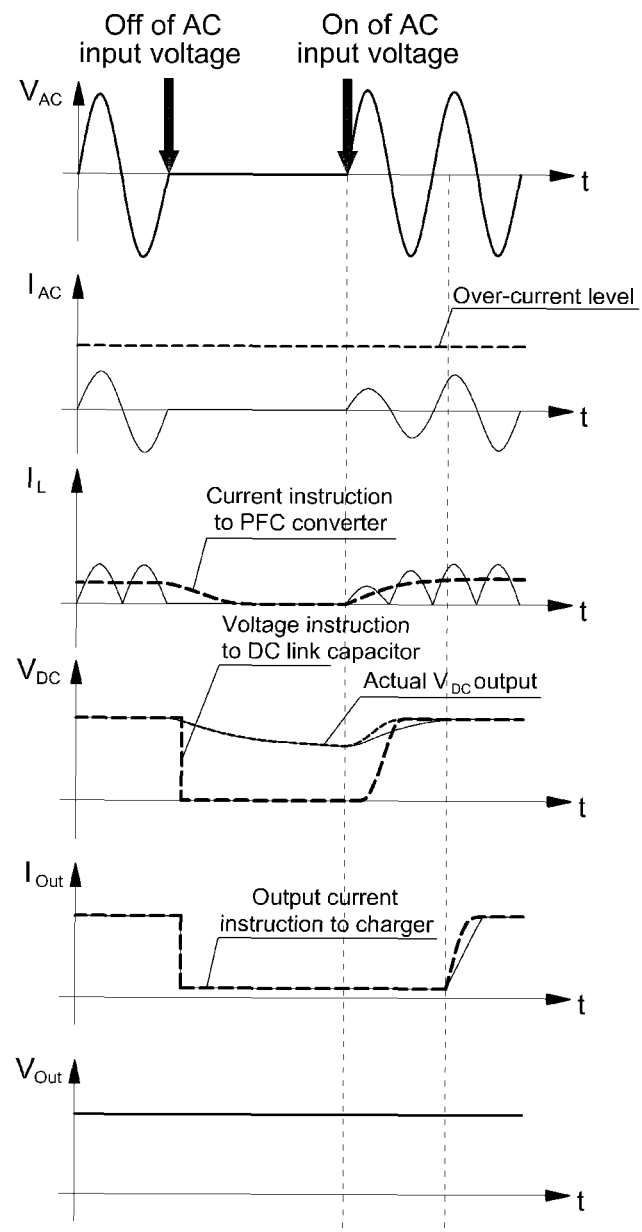
FIG. 3 is a graph illustrating a charging control process of an on-board battery charger when an instantaneous interruption of electric power occurs in an input power source according to an exemplary embodiment of the present invention.
Figure 4:
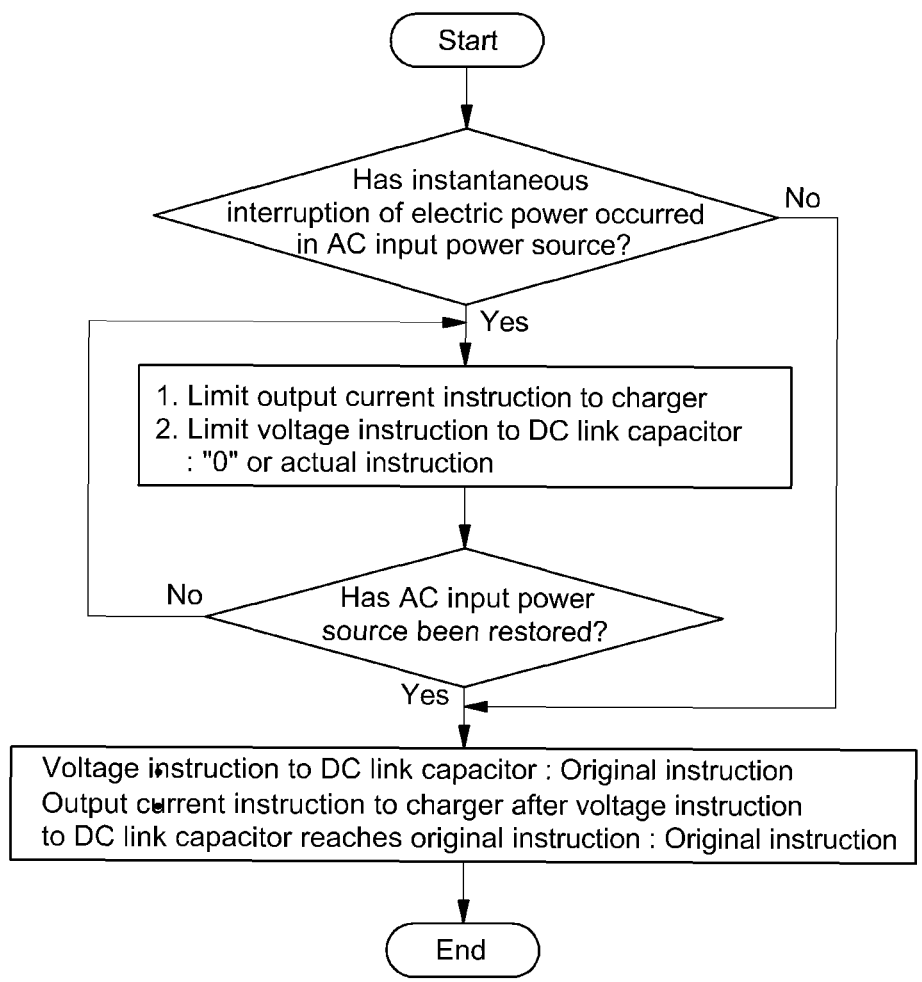
FIG. 4 is a flowchart illustrating an embodiment of a method for operating the on-board battery charger according to an exemplary embodiment the present invention.

Particularly, an exemplary embodiment of a method for controlling the on-board battery charger according to the present invention will be described as follows. FIG. 3 is a graph illustrating a charging control process of the on-board battery charger of the present invention when an instantaneous interruption of electric power occurs in an input power source. FIG. 4 is a flowchart illustrating an exemplary embodiment of a method for controlling the on-board battery charger according to the present invention. The following methods are understood to be executed by a main controller (e.g., upper controller or the like) having a memory and a processor.

First, during a charging operation of the on-board battery charger, it is determined whether interruption of the AC input power source occurs. Preferably, when the AC input power source is instantaneously turned off during the charging operation of the on-board battery charger, the PFC controller 3 and the DC-DC converter controller 8 determine that the interruption of the AC input power source has occurred.

Next, when the AC input power source is turned off due to the interruption of electric power, as indicated by an output current instruction to the charger in FIG. 3, the DC-DC converter controller 8 may be configured to output the output current instruction to the charger, i.e., adjust an output current instruction for charging the high-voltage battery to be limited to the minimum charging current. Additionally, when the AC input power source is turned off due to the interruption of electric power, as indicated by a voltage instruction to the first capacitor (DC link capacitor) in FIG. 3, the PFC controller 3 may be configured to output the voltage instruction to the first capacitor 4, i.e., the DC link capacitor connected to an output terminal of the PFC converter 1 to be updated to zero (0) or a current (actual) output voltage level of the first capacitor 4.

Figure 2:
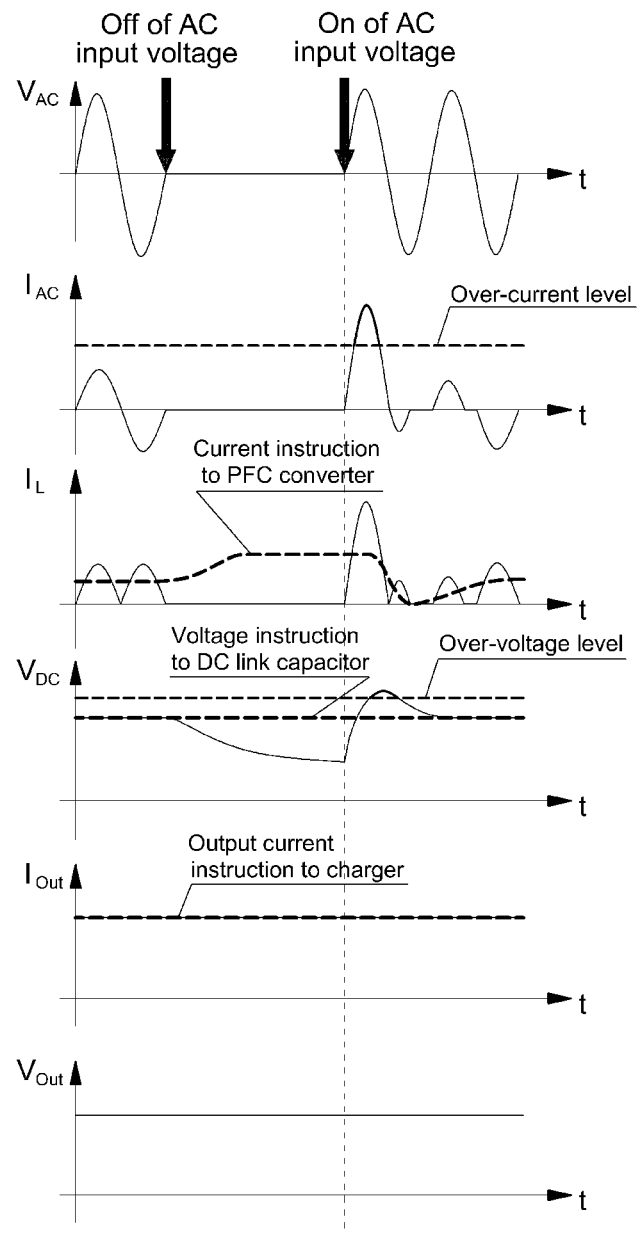
FIG. 2 is a graph illustrating a conventional charging control process of an on-board battery charger when an instantaneous interruption of electric power occurs in an input power source according to the related art.

In particular, the PFC controller 3 may be configured to output the voltage instruction to the first capacitor 4 to be updated to zero (0) or the current (e.g., actual) output voltage level (e.g., level where the output voltage $V_{DC}$ of the first capacitor gradually decreases to be less than the minimum voltage) to prevent a phenomenon wherein when the AC input power source is restored, a transient voltage is applied to the PFC converter and the DC link capacitor, and therefore, the output voltage of the first capacitor is output to an over-voltage level or greater (it can be seen that $V_{DC}$ exceeds the over-voltage level when the AC input power source is restored in FIG. 2).

Meanwhile, when the AC input power source is restored, that is, when the interruption of the AC input power source is released, the PFC controller 3 may be configured to output the voltage instruction to the first capacitor 4 to be gradually increased to the original instruction with a predetermined step or a predetermined slope. Further, in consideration that, when the AC input power source is restored, a transient voltage may be applied to the PFC converter and the DC link capacitor, the PFC controller 3 may be configured to output the voltage instruction to the first capacitor 4 to be increased to the original instruction with a predetermined step or a predetermined slope.

In addition, when the AC input power source is restored, the DC-DC converter controller 8 may be configured to output the output current instruction to the charger, i.e., the output current instruction for charging the high-voltage battery to not be limited to the minimum charging current and to be increased to the original charging current instruction. Particularly, the DC-DC converter controller 8 may be configured to adjust the output current instruction for charging the high-voltage battery to be gradually increased to the original charging current instruction with a predetermined step or a predetermined slope. In other words, the output current instruction for charging the high-voltage battery may be restored to the original charging current instruction at a time point when the restoration of the voltage instruction to the first capacitor to the original voltage instruction is completed.

Accordingly, when the interruption of electric power occurs in the AC input power source, the output current instruction for charging the high-voltage battery may be limited to the minimum charging current, and the voltage instruction to the DC link capacitor may be adjusted to be updated to zero (0) or an actual output voltage level, to prevent instantaneous over-current and over-voltage from being applied to the PFC converter and the DC link capacitor of the on-board battery charger. Accordingly, it may be possible to protect internal devices (e.g., a diode, a switch, a capacitor, etc) of the on-board battery charger, components, and the like.

Figure 5:
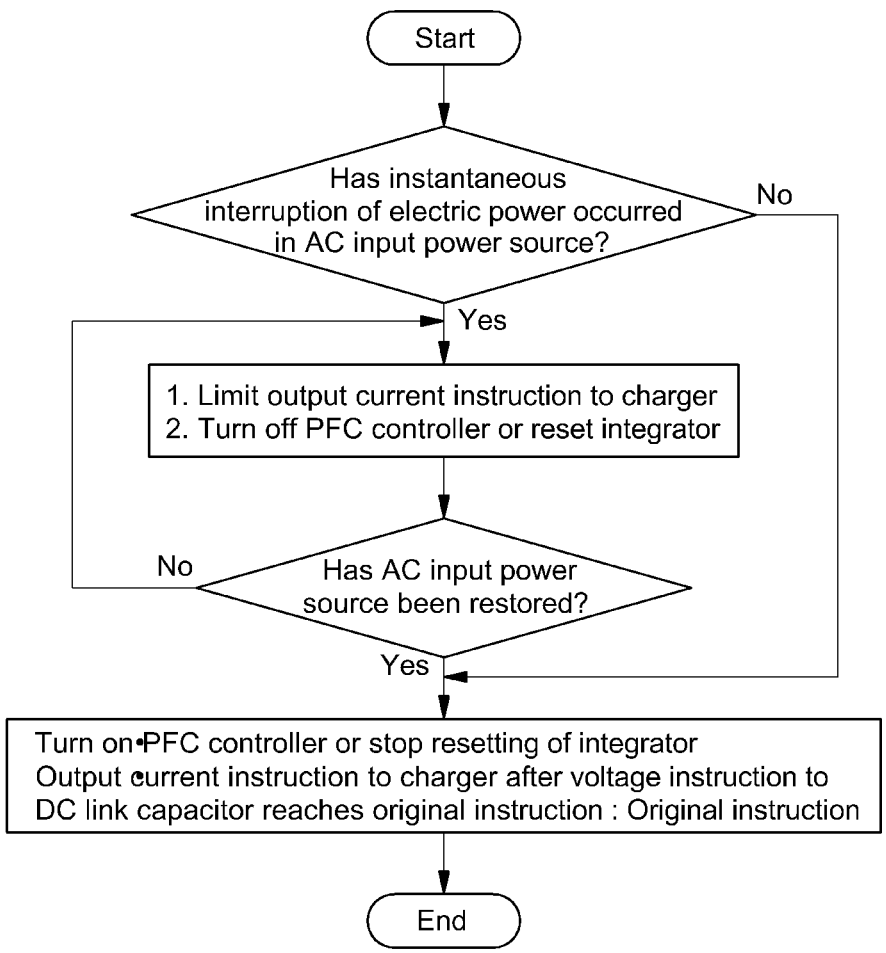
FIG. 5 is a flowchart illustrating another exemplary embodiment of the method for operating the on-board battery charger according to an exemplary embodiment the present invention.

Hereinafter, another exemplary embodiment of the method for controlling the on-board battery charger according to the present invention will be described as follows. FIG. 5 is a flowchart illustrating another exemplary embodiment of the method for controlling the on-board battery charger according to the present invention.

As in the method of the aforementioned exemplary embodiment, in the method of this exemplary embodiment, the output current instruction for charging the high-voltage battery may be limited to the minimum charging current when interruption of electric power occurs in the AC input power source. However, the method of this exemplary embodiment is different in terms of turning off the PFC controller from the beginning or resetting an integrator in the PC controller to output the voltage instruction to the first capacitor to be updated to zero (0). When the AC input power source is restored, the PFC controller may be turned on again, and the resetting of the integrator may be stopped.

As in the aforementioned exemplary embodiment, in this exemplary embodiment, when the interruption of electric power occurs in the AC input power source, the output current instruction for charging the high-voltage battery may be limited to the minimum charging current, and the voltage instruction to the DC link capacitor may be adjusted to be updated to zero (0) by turning off the PFC controller from the beginning to prevent instantaneous over-current and over-voltage from being applied to the PFC converter and the DC link capacitor of the on-board battery charger. Accordingly, it may be possible to protect internal devices (e.g., a diode, a switch, a capacitor, etc) of the on-board battery charger, components, and the like.

Figure 6:
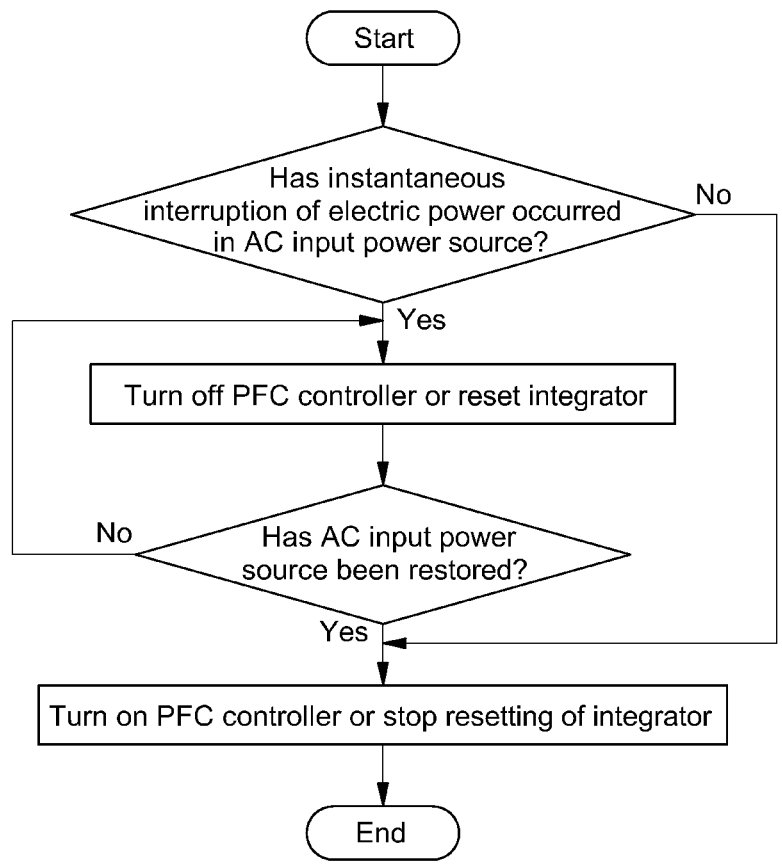
FIG. 6 is a flowchart illustrating still another exemplary embodiment of the method for operating the on-board battery charger according to an exemplary embodiment the present invention.

Further, still another exemplary embodiment of the method for controlling the on-board battery charger according to the present invention will be described as follows. FIG. 6 is a flowchart illustrating still another exemplary embodiment of the method for controlling the on-board battery charger according to the present invention.

In particular, the method of this exemplary embodiment may be performed similar to that of the aforementioned embodiment. However, the method of this exemplary embodiment is different in terms of turning off the PFC controller or resetting an integrator in the PC controller to output the voltage instruction to the first capacitor to be updated to zero (0) when the output current instruction for charging the high-voltage battery is not limited when interruption of electric power occurs in the AC power source. When the AC input power source is restored, the PFC controller may be turned on again, and the resetting of the integrator may be stopped.

Additionally, when the interruption of electric power occurs in the AC input power source, the voltage instruction to the DC link capacitor may be adjusted to be updated to zero (0) by turning off the PFC controller from the beginning when the output current instruction for charging the high-voltage battery is not limited, to prevent instantaneous over-current and over-voltage from being applied to the PFC converter and the DC link capacitor of the on-board battery charger. Accordingly, it may be possible to protect internal devices (e.g., a diode, a switch, a capacitor, etc) of the on-board battery charger, components, and the like.

As described above, the present invention provides advantages as follows.

First, although instantaneous interruption of electric power occurs in the AC input power source during a charging operation of the on-board battery charger, charging the high-voltage battery may be performed more stably and smoothly.

Second, instantaneous over-current and over-voltage may be prevented from being applied to the PFC converter and the DC link capacitor of the on-board battery charger when the AC input power is restored after the instantaneous interruption of the AC input power source, to protect internal devices (e.g., a diode, a switch, a capacitor, etc) of the on-board battery charger, components, and the like.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A method for controlling an on-board battery charger of an eco-friendly vehicle, comprising:
   determining, by a controller, whether interruption of electric power occurs in an alternating current (AC) input power source during a charging operation of the on-board battery charger;
   limiting, by the controller, an output current instruction for charging a high-voltage battery to a minimum charging current, when the interruption of electric power occurs in the AC input power source;
   outputting, by the controller, a voltage instruction to a first capacitor connected to an output terminal of a power factor corrector (PFC) converter to be updated to 0 or an actual output voltage level of the first capacitor;
   restoring, by the controller, the voltage instruction to the first capacitor to the original instruction, when the AC input power source is restored; and
   restoring, by the controller, the output current instruction for charging the high-voltage battery to the original charging current instruction.

2. The method of claim 1, wherein when the interruption of electric power occurs in the AC input power source, the voltage instruction to the first capacitor is adjusted to be updated to 0 by turning off a PFC controller or resetting an integrator in the PFC controller, and when the AC input power source is restored, the PFC controller is turned on again, and the resetting of the integrator is stopped.

3. The method of claim 1, wherein the voltage instruction to the first capacitor is gradually restored to the original instruction with a predetermined step or a predetermined slope.

4. The method of claim 1, wherein the output current instruction for charging the high-voltage battery is gradually restored to the original charging current instruction with a predetermined step or a predetermined slope.

5. The method of claim 1, wherein the output current instruction for charging the high-voltage battery is restored to the original charging current instruction at a time point when the restoration of the voltage instruction to the first capacitor to the original instruction is completed.

6. A system for controlling an on-board battery charger of an eco-friendly vehicle, comprising:
   a memory configured to store program instructions; and
   a processor configured to execute the program instructions, the program instructions when executed configured to:
   determine whether interruption of electric power occurs in an alternating current (AC) input power source during a charging operation of the on-board battery charger;
   limit an output current instruction for charging a high-voltage battery to a minimum charging current, when the interruption of electric power occurs in the AC input power source;
   output a voltage instruction to a first capacitor connected to an output terminal of a power factor corrector (PFC) converter to be updated to 0 or an actual output voltage level of the first capacitor;
   restore the voltage instruction to the first capacitor to the original instruction, when the AC input power source is restored; and
   restore the output current instruction for charging the high-voltage battery to the original charging current instruction.

7. The system of claim 6, wherein when the interruption of electric power occurs in the AC input power source, the voltage instruction to the first capacitor is adjusted to be updated to 0 by turning off a PFC controller or resetting an integrator in the PFC controller, and when the AC input power source is restored, the PFC controller is turned on again, and the resetting of the integrator is stopped.

8. The system of claim 6, wherein the voltage instruction to the first capacitor is gradually restored to the original instruction with a predetermined step or a predetermined slope.

9. The system of claim 6, wherein the output current instruction for charging the high-voltage battery is gradually restored to the original charging current instruction with a predetermined step or a predetermined slope.

10. The system of claim 6, wherein the output current instruction for charging the high-voltage battery is restored to the original charging current instruction at a time point when the restoration of the voltage instruction to the first capacitor to the original instruction is completed.

* * * * *